(12) United States Patent
Stava et al.

(10) Patent No.: US 8,680,431 B2
(45) Date of Patent: Mar. 25, 2014

(54) DEVICE AND METHOD TO CONTROL A POWER SOURCE

(75) Inventors: Elliott K. Stava, Sagamore Hills, OH (US); Keith L. Clark, Concord, OH (US)

(73) Assignee: Lincoln Global, Inc., City of Industry, CA (US)

( * ) Notice: Subject to any disclaimer, the term of this patent is extended or adjusted under 35 U.S.C. 154(b) by 522 days.

(21) Appl. No.: 12/946,071

(22) Filed: Nov. 15, 2010

(65) Prior Publication Data

US 2012/0118865 A1    May 17, 2012

(51) Int. Cl.
*B23K 9/10* (2006.01)

(52) U.S. Cl.
USPC ............ 219/130.31; 219/130.21; 219/130.32; 219/130.33; 219/137 R; 361/160; 307/125; 307/126

(58) Field of Classification Search
USPC ............. 219/130.21, 130.31, 130.32, 130.33, 219/78.01, 108, 110, 115, 116, 117.1, 219/121.36, 124.45, 121.46, 121.54, 219/130.01, 130.1, 130.5, 130.51, 136, 219/137 R, 137 PS, 137.2; 361/160; 307/125, 126

See application file for complete search history.

(56) References Cited

U.S. PATENT DOCUMENTS

| | | | |
|---|---|---|---|
| 4,450,340 A | | 5/1984 | Corrigall et al. |
| 4,672,166 A | | 6/1987 | Ladeburg et al. |
| 5,513,093 A | * | 4/1996 | Corrigall ........................ 363/85 |
| 5,645,741 A | * | 7/1997 | Terayama et al. .......... 219/130.4 |
| 5,773,792 A | * | 6/1998 | Hagiwara et al. .......... 219/130.1 |
| 6,127,650 A | * | 10/2000 | Naruto et al. .............. 219/130.1 |
| 6,194,681 B1 | * | 2/2001 | Moriguchi et al. ...... 219/121.54 |
| 6,268,587 B1 | | 7/2001 | Kooken et al. |
| 6,570,130 B1 | | 5/2003 | Kooken et al. |
| 6,791,062 B1 | | 9/2004 | Brunner et al. |
| 7,238,917 B2 | | 7/2007 | Stava et al. |
| 2002/0144989 A1 | | 10/2002 | Sammons et al. |
| 2003/0066823 A1 | | 4/2003 | DeCoster |
| 2004/0069752 A1 | * | 4/2004 | Ulrich et al. ............. 219/121.39 |

(Continued)

FOREIGN PATENT DOCUMENTS

| | | |
|---|---|---|
| CN | 101293301 | 10/2008 |
| CN | 101412140 | 4/2009 |

OTHER PUBLICATIONS

PCT/IB2011/002615 International Search Report dated Mar. 19, 2012.
PCT/IB2011/002615 Written Opinion dated Mar. 19, 2012.

*Primary Examiner* — Dana Ross
*Assistant Examiner* — James Sims, III
(74) *Attorney, Agent, or Firm* — Hahn Loeser & Parks LLP; Brendan E. Clark (57) ABSTRACT

Apparatus, devices, and methods for providing a voltage reduction capability in a welding power source for safety purposes. The resistive load and the output voltage of the welding power source output are monitored and compared to predefined or preselected threshold values to generate a load condition signal and an output voltage condition signal (e.g., logic signals). The load condition signal and the output voltage condition signal serve as inputs to a voltage reduction device control logic which generates control signals to enable and disable the input and output of the welding power source according to the defined control logic. As a result, an extra measure of safety in preventing electrical shock is provided to users of the welding power source during hazardous operating conditions.

19 Claims, 7 Drawing Sheets

(56) References Cited

U.S. PATENT DOCUMENTS

| | | |
|---|---|---|
| 2004/0089645 A1 | 5/2004 | Saccon et al. |
| 2004/0162630 A1 | 8/2004 | Hillen et al. |
| 2005/0171647 A1 | 8/2005 | Kunsman et al. |
| 2006/0027545 A1 | 2/2006 | Stava et al. |
| 2006/0157459 A1 | 7/2006 | Fosbinder |
| 2006/0207979 A1 | 9/2006 | Daniel |
| 2009/0184098 A1 | 7/2009 | Daniel et al. |
| 2010/0170880 A1 | 7/2010 | Hsu et al. |

* cited by examiner

| Load/No-Load | Hi/Lo Voltage | Welder Input | Welder Output |
|---|---|---|---|
| 0 (no load) | 1 ($V_{RMS} > V_T$) | 1 (disabled) | 0 (disabled) |
| 0 (no load) | 0 ($V_{RMS} < V_T$) | 0 (enabled) | 0 (disabled) |
| 1 (load) | 0 ($V_{RMS} < V_T$) | 0 (enabled) | 1 (enabled) |
| 1 (load) | 1 ($V_{RMS} > V_T$) | 0 (enabled) | 1 (enabled) |

DEVICE AND METHOD TO CONTROL A POWER SOURCE

The description of the preferred embodiment section and the drawings of U.S. Pat. No. 7,238,917 issued on Jul. 3, 2007 are incorporated by reference herein in their entirety.

TECHNICAL FIELD

Certain embodiments relate to welding power sources. More particularly, certain embodiments relate to devices and methods for providing a voltage reduction capability in welding power sources for safety purposes.

BACKGROUND

Several techniques have been used to reduce the open circuit voltage of an arc welding power source before the welder is to be used for a welding process. One of the most common designs is a control circuit that reduces the conduction period of the output switching devices, so the open circuit voltage is retained at a desired lower value. In an inverter type power source, the switching devices are usually in the form of field effect transistors (FETs) or insulated gate bi-polar transistors (IGBTs). Since the switching frequency is usually greater than 20 kHz, the conduction period of these switching devices is very short and depends upon the operating frequency of the inverter. In order to reduce the open circuit voltage to a low level, the minimum conduction period of the switching devices requires a complicated and electrically demanding control circuit. Power sources employing such open circuit voltage (OCV) control devices also include a circuit to release the control of the power source to allow the welding power to be obtained during welding. Such detection devices with releasing circuits are usually prone to noise and sensitivity problems.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY

Embodiments of the present invention comprise devices and methods for providing voltage reduction capability in welding power sources for safety purposes. The resistive load and the output voltage of the welding power source output are monitored and compared to predefined or preselected threshold values to generate a load/no-load condition signal and a high/low output voltage condition signal (e.g., logic signals). The load/no-load condition signal and the high/low output voltage condition signal serve as inputs to a voltage reduction device control logic which generates control signals to enable and disable the input and output of the welding power source according to the defined control logic. As a result, an extra measure of safety in preventing electrical shock is provided to users of the welding power source in hazardous operating conditions.

These and other features of the claimed invention, as well as details of illustrated embodiments thereof, will be more fully understood from the following description and drawings.

DETAILED DESCRIPTION

Figure 1:
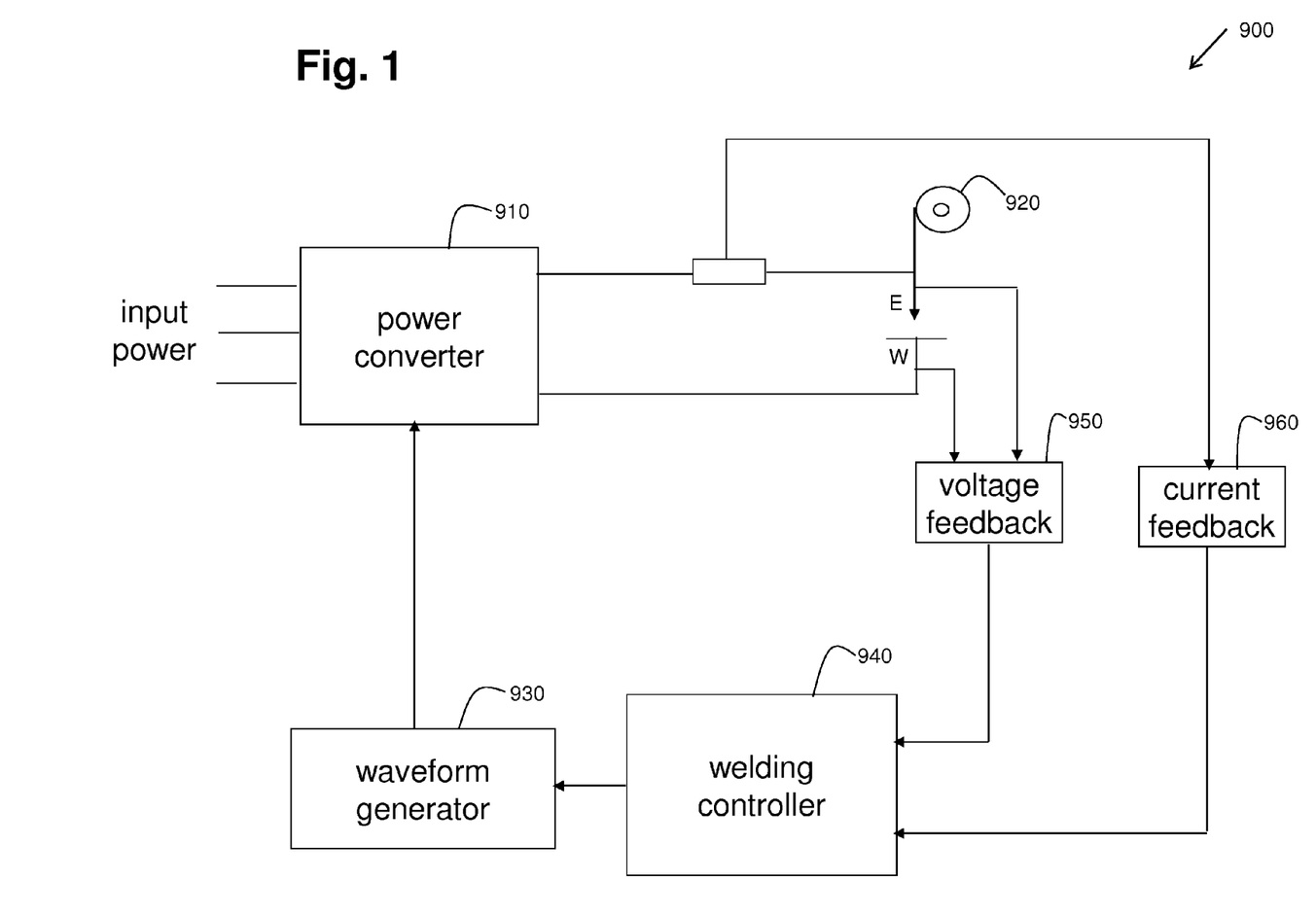
FIG. 1 illustrates a schematic block diagram of an example embodiment of an electric arc welding system which may incorporate a voltage reduction capability for safety purposes, in accordance with various embodiments of the present invention.

FIG. 1 illustrates a schematic block diagram of an example embodiment of an electric arc welding system 900 which may incorporate a voltage reduction capability for safety purposes in accordance with various embodiments of the present invention. The system 900 includes a power converter 910 providing welding output power between a welding electrode E and a workpiece W. The power converter 910 may be of an inverter type that includes an input power side and an output power side, for example, as delineated by the primary and secondary sides, respectively, of a welding transformer. Other types of power converters are possible as well. A wire feeder 920 feeds the wire welding electrode E toward the workpiece W. Alternatively, the electrode E may be a stick electrode and, therefore, the wire feeder 920 is not used.

The system 900 further includes a waveform generator 930 and a welding controller 940. The waveform generator 930 generates welding waveforms at the command of the welding controller 940. The waveform generated by the waveform generator 930 modulates the output of the power converter 910 to produce the welding output power between the electrode E and the workpiece W.

The system 900 may further include a voltage feedback circuit 950 and a current feedback circuit 960 to monitor the welding output voltage and current between the electrode E and the workpiece W and provide the monitored voltage and current back to the welding controller 940. The feedback voltage and current may be used by the welding controller 940 to make decisions with respect to modifying the welding waveform generated by the waveform generator 930 and/or to make other decisions that affect safe operation of the system 900, for example.

Figure 2:
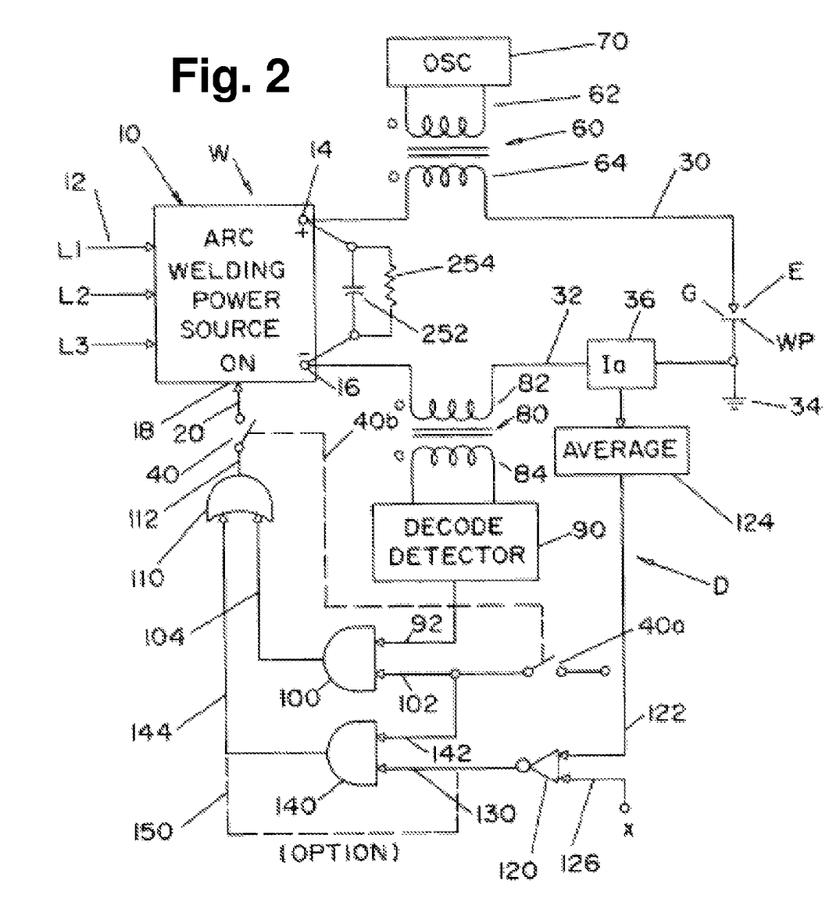
FIG. 2 is provided to illustrate a schematic block diagram of an example embodiment of a prior voltage reduction capability implemented in the prior electric arc welder embodiment (as described in the preferred embodiment section and drawings of U.S. Pat. No. 7,238,917 which are incorporated herein by reference) which may also be implemented in the electric arc welding system 900 of FIG. 1.

U.S. Pat. No. 7,238,917 describes a prior electric arc welder embodiment having a voltage reduction capability for safety purposes. As a way to introduce the detailed description of certain improved embodiments described herein, FIG. 2 is provided to illustrate a schematic block diagram of an example embodiment of a prior voltage reduction capability implemented in the prior electric arc welder embodiment (as described in the preferred embodiment section and drawings of U.S. Pat. No. 7,238,917 which are incorporated herein by reference) which may also be implemented in the electric arc welding system 900 of FIG. 1, for example. The welder shown in FIG. 2 is of the type used for AC or DC welding for MIG welding, TIG welding, stick welding and submerged arc welding in both CC and CV modes.

The welder of FIG. 2 includes power source 10 having a three phase input 12 and output terminals 14, 16 connected to welding cables 30, 32, respectively. The welding operation is schematically illustrated as an electrode E, which can be a consumable wire directed toward workpiece WP connected to ground terminal 34. Gap G is located between electrode E and workpiece WP and is used in standard welding technology. The average welding current is measured by shunt 36. When welding is performed by the welder, power source 10 is activated to provide power at terminals 14, 16.

Power source 10 is preferably an inverter based power source having an ON terminal 18 controlled by the logic on input line 20. A logic one or starting signal on line 20 activates power source 10 to provide welding power at terminals 14, 16. A logic zero on line 20 (no starting signal) turns power source 10 off or down to a very low open circuit voltage. Power source 10, when activated, has an open circuit voltage across terminals 14, 16 which is high. When the power source is deactivated by a logic zero on line 20, the open circuit voltage of power source 10 is zero. To turn the power source fully on, switch 40 or a contact from the trigger of the welding gun is closed in accordance with standard technology.

The welder of FIG. 2 relates to the concept of maintaining the power source at zero open circuit voltage until switch 40 is closed and there is a low resistance across gap G. This low resistance indicates that the welder is in a condition preparatory to beginning the welding operation. A resistance across gap G greater than the set given amount indicates that the gap is still open and there is a demand for no open circuit voltage or a low OCV. An open circuit voltage is not required or desired in a welding operation until the welding process is to be initiated. This condition of the gap is recognized as a low resistance across gap G. Indeed, the resistance is often zero by electrode E touching workpiece WP to start the welding process. The open circuit voltage of the power source 10 is maintained at zero or a low level (which is equivalent to zero) until there is a detected indication that a welding operation is being initiated. This event is accomplished by determining the resistance across gap G.

A more specific use of the welder of FIG. 2 is creating "an enable signal" when (a) the welding operation is initiated by a low resistance in gap G (creating a "start signal") and (b) trigger switch 40 is closed. The closing of switch 40 is a positive act after or when the electrode approaches or contacts workpiece WP. Power source control device D is used to reduce the open circuit voltage of power source 10 until the resistance in gap G is below a given amount, which given amount is generally less than 100 ohms, 50 ohms, or 30 ohms according to the desired setting of device D. Device D includes an input transformer 60 having a primary winding 62 and a secondary winding 64. Winding 64 is a single turn of cable 30, which cable is passed through a tube. About the tube is a toroid with three turns wound upon it, which constitutes the primary winding 62. The tube as defined above could be a conductor such as copper or aluminum so that cable 30 electronically terminates at both ends of the tube. This is known transformer technology, where one turn is a low resistance strap. Primary winding 62 is energized at a high frequency by a low voltage signal created by oscillator 70. The set frequency is generally greater than 50 kHz and preferably in the range of 60 to 90 kHz. In practice, oscillator 70 is set at 85 kHz. The current of this signal is limited to a low value. In accordance with an embodiment of the present invention, the signal current is less than 40 ma.

Input transformer 60 induces a high frequency low voltage signal into the series circuit comprising cable 30, electrode E, gap G, workpiece WP, shunt 36, cable 32 and the internal resistance and inductance between terminals 14, 16 of power source 10. Consequently, a high frequency signal is induced into this series circuit. The obtainable magnitude of this signal is determined by the resistance in gap G. This magnitude is sensed by output transformer 80 having a primary winding 82 and a secondary winding 84. Winding 82 is a single turn winding such as secondary winding 64 of input transformer 60. The high frequency signal induced into secondary winding 84 is directed to the tuned decoding detector 90 which detector is constructed in accordance with standard technology to provide a logic signal on output 92 when the resistance of gap G is below a given amount. Consequently, a logic 1 on output start signal line 92 indicates that electrode E is touching workpiece WP preparatory to and beginning a welding operation. A "start signal" in line 92 is created when gap G has a resistance less than a given amount. To accomplish this objective, there is an input transformer inducing a high frequency low voltage signal in the series circuit including gap G. Output transformer 80 detects and measures the magnitude of the signal at the set frequency. The magnitude of any signal at the set high frequency is measured by detector 90 and creates an output logic one or "start signal" on line 92. How this start signal is used to start power source 10 is in accordance with another aspect of an embodiment of the present invention. The broad concept as described can be used with diverse starting logic for power source 10.

In accordance with an embodiment of the present invention, power source control device D utilizes a "start signal" on line 92. This signal is used to control power source 10. The "start signal" is one input of an ANDing circuit 100 having a second input 102 from contact 40a of the trigger switch. The term contact or switch will be used interchangeably for items 40 and 40a. Contacts 40 and 40a are the trigger switch contacts which are closed when a welding operation is initiated by an operator or by an automatic mechanism. Device D may include only contact 40a. However, the other contact 40 is also illustrated to show that power source 10 is not operated until there is a low resistance at gap G and the trigger is closed to initiate the welding operation. ANDing circuit 100 has output 104 for an "enabling signal" that is a logic one when the power source 10 is to be fully on. This enable signal does not occur unless the trigger switch 40a is closed. Thus, contact 40 is closed by means 40b to connect line 20.

Output 104 of ANDing circuit 100 is directed to starting circuit 110 in the form of an OR gate with one input being the "enabling signal" on line 104. Thus, when line 104 is a logic one, output 112 of starting circuit 110 is a logic one. This starts power source 10 so it is at full power, i.e. welding power. With switch 40a closed, switch 40 is also closed. In most welder power sources, there is an internal low impedance branch between terminals 14, 16 as represented by the parallel circuit of capacitor 252 and resistor 254. If device D is retrofitted on a power source without a low impedance between its output terminal, such circuit is added so the series circuit with gap G has a low impedance.

Switch 40 in line 20 can be eliminated in practicing various embodiments of the present invention. However, it is used with an override network involving a welding current detector. After a "start signal" in line 92, the welding cycle commences and welding current flows. As long as there is welding current, the power source should stay at the full on state. The full on state means it has a welding power which may be low, such as with TIG welding. When the welding current flows, transformers 60, 80 may saturate and become ineffective to maintain a logic one on line 92. There is no "start signal" after the device D has accomplished its objective at the start of a welding cycle. To hold the power source on after the transformers saturate, the logic network includes an override segment in the form of comparator 120. The voltage or input signal on line 122 is provided by welding current averaging circuit 124. Consequently, the voltage on line 122 is representative of the average welding current of welder W. This average welding current is compared by detector 120 with the voltage on a second input 126. This input has a voltage representing a low reference current x. By this logic network, when the average welding current represented by the voltage on line 122 is greater than a certain fixed lower amount, (and the transformers are saturated) comparator or welding current detector 120 produces a logic one on output line 130 which is a "welding current signal."

The welding current signal on line 130 can be used in two separate branches of device D. The first branch directs the welding current signal on line 130 to AND gate 140 having an input 142 represented by a logic one upon closing of trigger switch 40a. This action releases gate 140 for operation in accordance with the logic on input line 130. Thus, the logic on line 144 is a "welding current signal" appearing when there is a welding current of at least a small amount. In this branch of the welding current signal processor feature used in device D, the logic on line 144 is enabled only when trigger switch contact 40a is closed.

In an alternative, optional operation, as illustrated by dashed line 150, the logic on line 144 merely reflects the logic on line 130. When a logic one appears on line 144 there is a welding current above a given small amount. When this occurs, starting circuit 110 is activated to produce a starting signal or logic on line 112. In this optional operation, when there is a welding current and the trigger switch is closed, switch 40 is closed and the power source is on. When the welding operation is stopped, trigger switch contact 40 is opened. Power source 10 is deactivated to a zero open circuit voltage awaiting the next starting operation implemented and controlled through device D. As can be seen, trigger switch 40 may be eliminated and is used primarily when the device D generates a welding current signal bypassing the remainder of the circuitry of device D. So whenever there is welding current and/or the transformers are saturated, the power source is still held on.

As can be appreciated from FIG. 2, device D turns on power source 10 when the resistance across gap G is below a given amount, which is accomplished by inducing a high frequency, low voltage signal in a series circuit including the gap and measuring the magnitude of the signal by a tuned detector (receiver) to create a start signal in line 92. Otherwise, the power source remains off with a zero open circuit voltage. It is possible to use transformers that do not saturate, then the start signal will be held during welding and there is no need for the override portion of the logic network.

Again, the welder of FIG. 2 was previously disclosed in U.S. Pat. No. 7,238,917. Improvements and modifications to the voltage reduction device capability of U.S. Pat. No. 7,238,917 will now be described herein in accordance with FIGS. 3-7.

Figure 3:
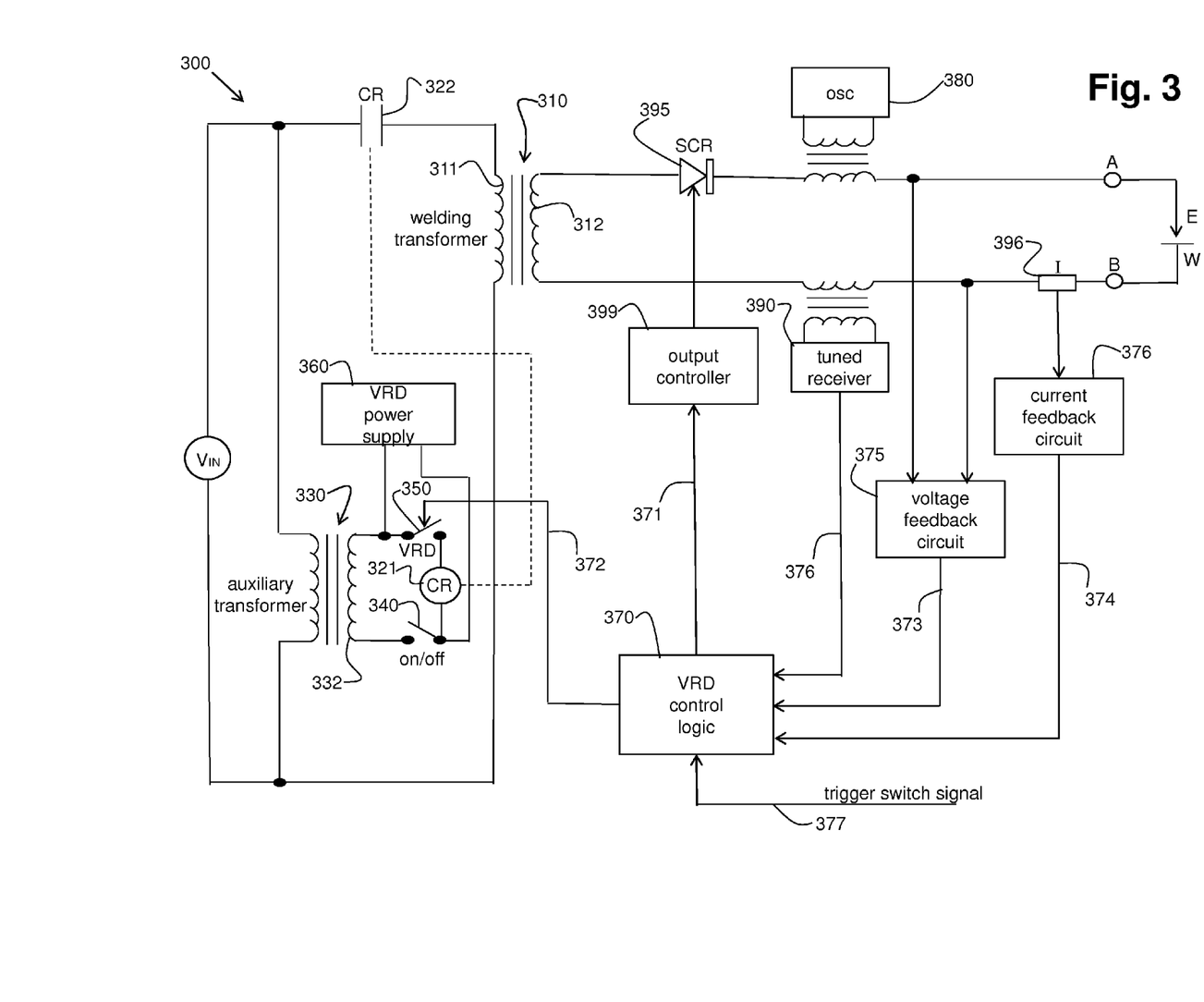
FIG. 3 illustrates a schematic block diagram of an example embodiment of an improved voltage reduction device implemented in a first embodiment of a welding power source that may be implemented in the electric arc welding system of FIG. 1.

FIG. 3 illustrates a schematic block diagram of an example embodiment of an improved voltage reduction device implemented in a first embodiment of a welding power source 300 that may be implemented in the electric arc welding system 900 of FIG. 1. FIG. 3 shows an input power side of the power source 300, being on the primary side of a welding transformer 310, and an output power side of the power source, being on the secondary side of the welding transformer 310.

The input power side of the power source 300 in FIG. 3 includes the primary winding 311 of the single phase welding transformer 310 along with an input power contact relay CR having an energizing coil 321 and a set of electrical relay contacts 322. The primary winding 311 and the relay contacts 322 are in series with an input power source $V_{IN}$ when $V_{IN}$ is applied to the input of the power source 300. The input power side also includes an auxiliary transformer 330 having a primary side connected to $V_{IN}$ and a secondary side connected to a main ON/OFF switch 340 of the power source 300. The main ON/OFF switch 340 is accessible to a user on the front panel of the power source 300, in accordance with an embodiment of the present invention.

As can be seen in FIG. 3, the secondary side of the auxiliary transformer 330 includes a secondary winding 332 in series with the ON/OFF switch 340, the relay coil 321, and a voltage reduction device (VRD) switch 350. In order for the relay coil 321 to be energized by the secondary winding 332 of the auxiliary transformer 330, both the ON/OFF switch 340 and the VRD switch 350 must be closed. When the relay coil 321 is energized, the contacts 322 of the contact relay CR are closed and current is able to flow from $V_{IN}$ through the contacts 322, through the primary winding 311 of the welder transformer 310, and back to $V_{IN}$ (and vice versa).

The power source 300 also includes a VRD power supply 360 which connects to and derives power from the secondary side of the auxiliary transformer 330 on the input power side of the power source 300, as shown. The VRD power supply 360 is part of the VRD device and provides electrical power to the various VRD components in the power source 300 as needed. The various VRD components that power may be supplied to in various embodiments may include the VRD switch 350, a VRD control logic 370, an oscillator circuit 380, and a tuned receiver circuit 390, the operation of which are described in more detail later herein. In accordance with an embodiment of the present invention, all of the VRD components are located internally within the power source 300, making it difficult for a user to override the VRD functionality described herein.

As current flows through the primary winding 311 when the contacts 322 of the contact relay CR are closed, the secondary winding 312 of the welding transformer 310 may be energized on the secondary side of the power source 300. The secondary side of the power source 300 may include one or more output control power switching devices such as silicon controlled rectifiers (SCR's), IGBT's, or FET's, for example, as are well known in the art. As an example, FIG. 3 shows an SCR 395 connected to the secondary winding 312 of the welding transformer 310. The SCR 395 is shown generically and may represent a plurality of SCR's in an output configuration. The oscillator circuit 380 is connected to the output of the SCR 395 as shown on the electrode side E of the output current path of the power source 300. The tuned receiver circuit 390 is connected to the secondary winding 312 on the workpiece side W of the output current path of the power source 300. However, other configurations are possible as well, in accordance with other embodiments of the present invention. For example, the oscillator circuit 380 may instead be on the workpiece side W and the tuned receiver circuit 390 may be on the electrode side E. Furthermore, both the oscillator circuit 380 and the tuned receiver circuit 390 may be implemented in series on either the electrode side E or on the workpiece side W, for example.

The output side of the power source 300 also includes a voltage feedback circuit 375 and a current feedback circuit 376 providing signals being representative of output voltage and output current to the input of the VRD control logic 370. The output voltage may be sampled across the welding output terminals A and B of the power source 300, and the output current may be sampled through a shunt device 396 in the welding output current path. In accordance with various embodiments of the present invention, the voltage feedback circuit 375 may provide a signal 373, which may be a RMS voltage signal or a logical (high/low) output voltage condition signal for example, to the VRD control logic 370. Furthermore, in accordance with various embodiments of the present invention, the current feedback circuit 376 may provide a signal 374, which may be an average current of the welding output to the VRD control logic 370 or a logical (high/low) output current condition signal for example, to the VRD control logic 370. Other types of signals being representative of the output voltage and the output current are possible as well.

The output side of the power source 300 further includes an output controller 399 and the VRD control logic 370. Just as the voltage feedback circuit 375 and the current feedback circuit 376 provide signals to the VRD control logic 370, the tuned receiver circuit 390 provides a signal 376 to the VRD control logic 370 which may be a resistance level signal or a logical (high/low) load/no-load condition signal. The signal 376 provided by the tuned receiver circuit 390 defines a load condition or a no-load condition at the output of the welding power source 300. A load condition corresponds to a relatively low resistance between the electrode E and the workpiece W (e.g., when welding), whereas a no-load condition corresponds to a relatively high open circuit resistance value between the electrode E and the workpiece W (e.g., when not welding).

The oscillator circuit 380 and the tuned receiver circuit 390 operate in much the same manner as the corresponding oscillator and decode detector circuit components of FIG. 2 herein. The oscillator circuit 380 induces an oscillating signal (e.g., at 80 kHz) in the welding output current path and the tuned receiver circuit 390, which is tuned to the frequency of the oscillating signal, receives the induced oscillating signal in the welding output current path. Both the inducing and the receiving are accomplished via transformer coupling to the welding output circuit path within the power source 300. Such transformer coupling is described in detail in U.S. Pat. No. 7,238,917. The level of detection or sensing by the tuned receiver circuit 390 depends on the load or resistance between the electrode E and the workpiece W. The level of detection may be compared to a threshold value to define a load condition or a no-load condition of the welding output. A trigger switch signal 377 from, for example, a welding gun may also serve as an input to the VRD control logic 370, in accordance with an embodiment of the present invention.

The VRD control logic 370 operates on some or all of the input signals to produce an output enable signal 371 that is provided to the output controller 399. For example, in accordance with an embodiment of the present invention, the output controller 399 may disable the output side of the power source 300 (e.g., by turning off the SCR 395) when the load/no-load signal 376 indicates a no-load condition. Similarly, the output controller 399 may enable the output side of the power source 300 (e.g., by turning on the SCR 395) when the load/no-load signal 376 indicates a load condition. In this manner, when the welder is not currently being used for welding but is connected to an input power source $V_{IN}$ and the on/off switch 340 is on, a higher resistance (no-load condition) is detected and the output of the power source 300 is disabled.

Furthermore, the VRD control logic 370 operates on some or all of the input signals to produce an input disable signal 372 that is provided to the VRD switch 350 on the input power side of the power source 300. For example, in accordance with an embodiment of the present invention, the VRD switch 350 (which is normally closed) may be opened when the load/no-load condition signal 376 indicates a no-load condition and the high/low output voltage condition signal 373 indicates a high output voltage condition. In this manner, the contact relay 322 is opened when the VRD switch 350 is opened, disallowing current to flow through the primary winding 311 of the welder transformer 310. Therefore, output power cannot be generated on the secondary or output side of the power source 300.

In this manner, an extra measure of safety is provided. For example, even if the output of the power source 300 is being commanded to be disabled by the output controller 399 because of a no-load condition being detected, an output voltage could still appear across the output terminals A and B if a failure or defect occurs in the output side of the power source 300. For example, if the SCR 395 were to fail by shorting, a relatively high output voltage level could still appear across the terminals A and B, which can be potentially dangerous during a non-welding (no-load) situation. However, the high output voltage condition is sensed and the VRD control logic 370 commands the VRD switch 350 to open, shutting down the input power side of the power source 300.

When the VRD switch 350 is opened, because of a high output voltage condition, and the on/off switch 340 is still closed, power is still able to be supplied to the VRD power supply 360. As a result, the various components of the VRD device are still being supplied with electrical power and are able to operate. In accordance with an embodiment of the present invention, to reset (i.e., close) the VRD switch 350, the on/off switch 340 has to be toggled off and then on again. This resets the VRD switch 350 and enables the input power side of the power source 300, unless the VRD control logic 370 is still sensing a no-load condition and a high output voltage condition, in which case the VRD switch 350 will immediately open again. Such a situation may indicate that the power source 300 requires servicing, repair, or replacement.

Figure 4:
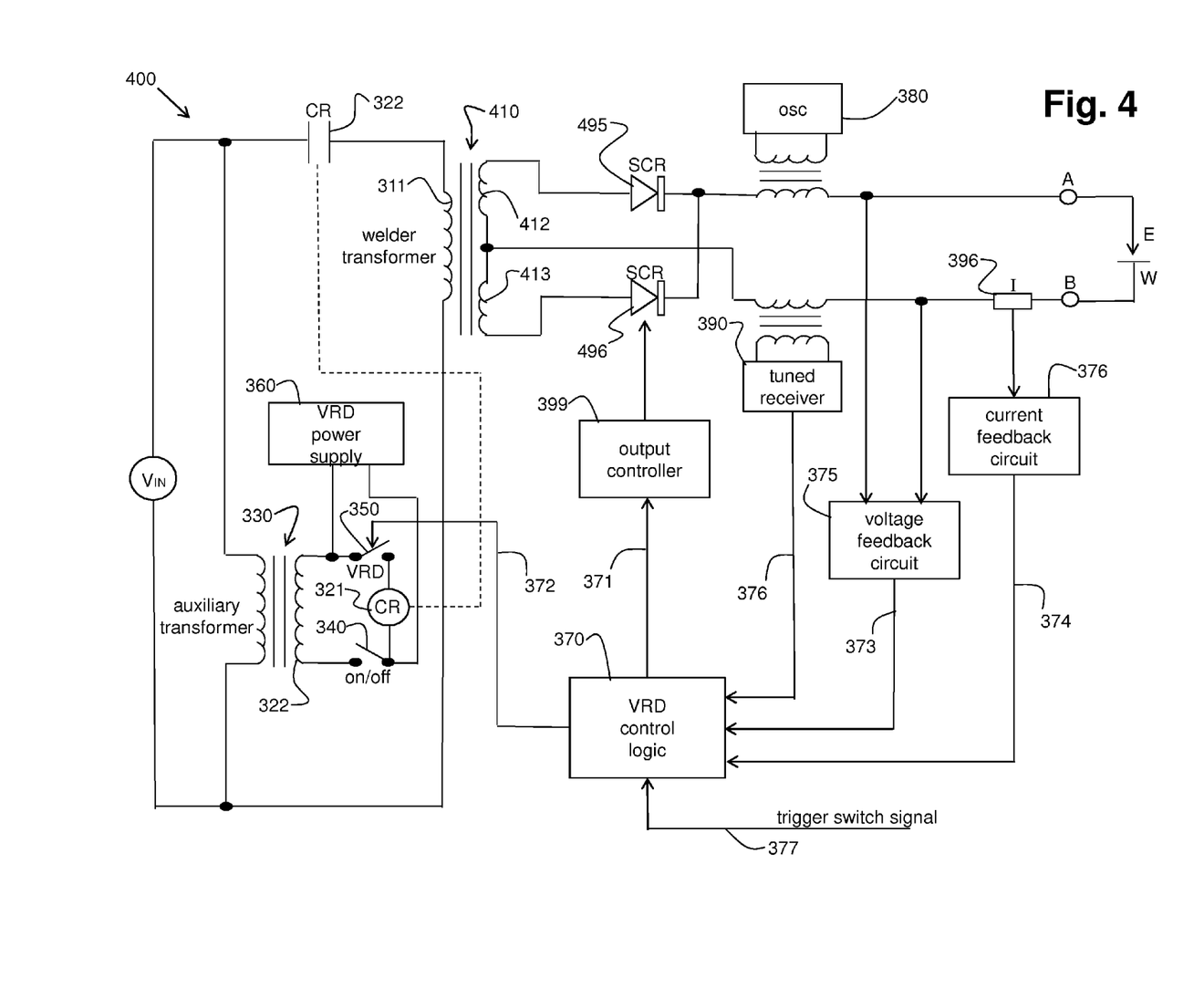
FIG. 4 illustrates a schematic block diagram of an example embodiment of an improved voltage reduction device implemented in a second embodiment of a power source of the electric arc welding system of FIG. 1.

FIG. 4 illustrates a schematic block diagram of an example embodiment of an improved voltage reduction device implemented in a second embodiment of a power source 400 of the electric arc welding system 900 of FIG. 1. The power source 400 of FIG. 4 is very similar to the power source 300 of FIG. 3 except that the output power side of the power source 400 of FIG. 4 is configured a little differently as a single phase full bridge configuration. Instead of having a single secondary winding as in FIG. 3, FIG. 4 shows a welding transformer 410 having two secondary windings 412 and 413 and two SCR's 495 and 496. The output controller 399 is configured to enable and disable such a configuration of output components. The VRD components of FIG. 4 are the same as that of FIG. 3, however, and VRD capability and operation are the same.

Figure 5:
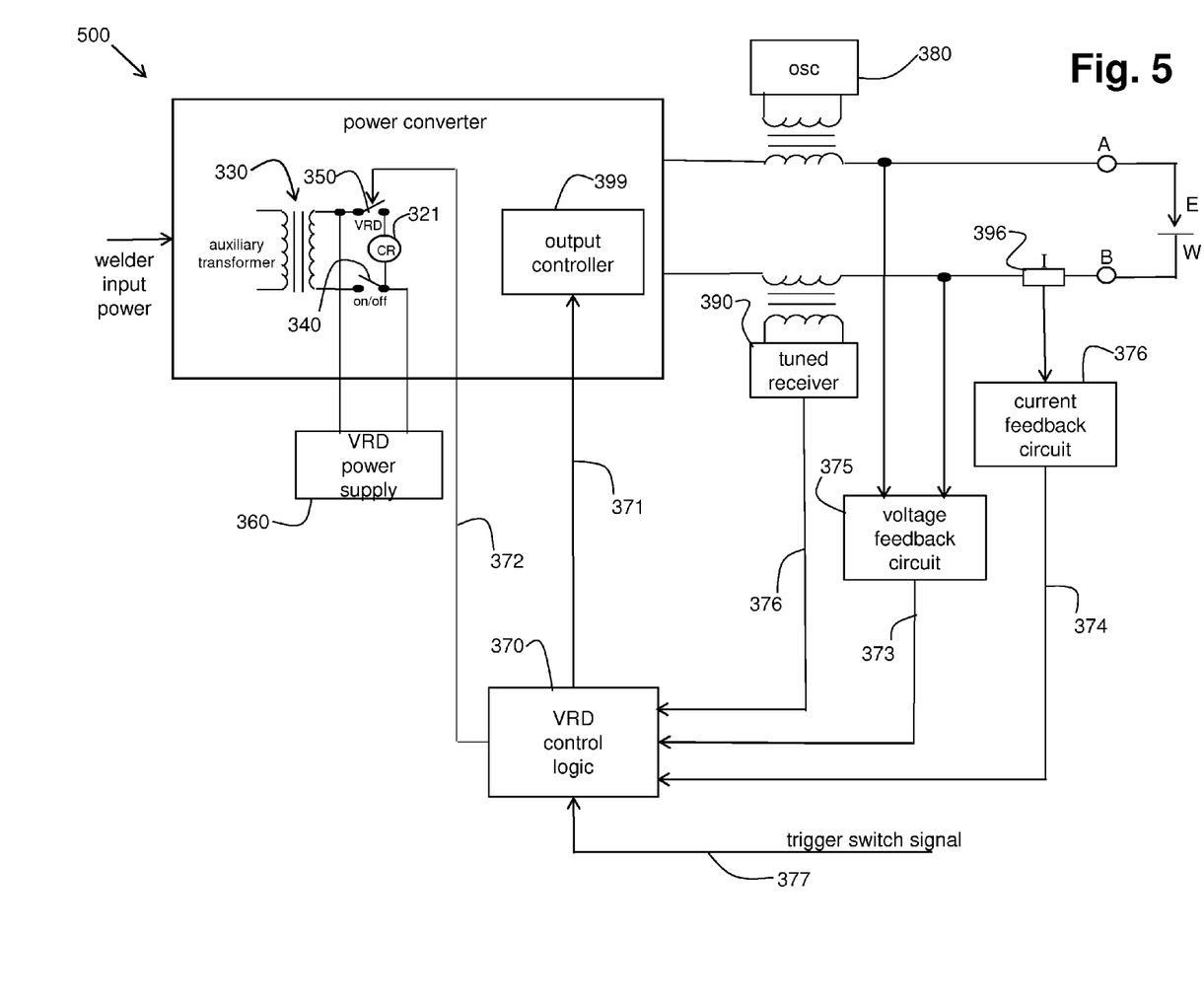
FIG. 5 illustrates a schematic block diagram of an example embodiment of an improved voltage reduction device implemented in a generic embodiment of a power source of the electric arc welding system of FIG. 1.

FIG. 5 illustrates a schematic block diagram of an example embodiment of an improved voltage reduction device implemented in a generic embodiment of a power source 500 of the electric arc welding system 900 of FIG. 1. FIG. 5 is intended to illustrate that the VRD device of FIG. 3 and FIG. 4 may be implemented in many other types of power sources having various power converter configurations including single phase configurations and multi-phase configurations (e.g., three-phase configurations) and inverter or chopper configurations, for example. FIG. 5 shows the auxiliary transformer 330 with the on/off switch 340, the VRD switch 350, and the relay coil 321 in series with each other on the secondary side of the auxiliary transformer 330, as in FIG. 3 and FIG. 4, for disabling the input power side of the generic power source 500. FIG. 5 also shows the output controller 399 for enabling and disabling the output power side of the generic power source 500. Again, the VRD components of FIG. 5 are the same as that of FIG. 3 and FIG. 4, and VRD capability and operation are the same.

Figure 6:
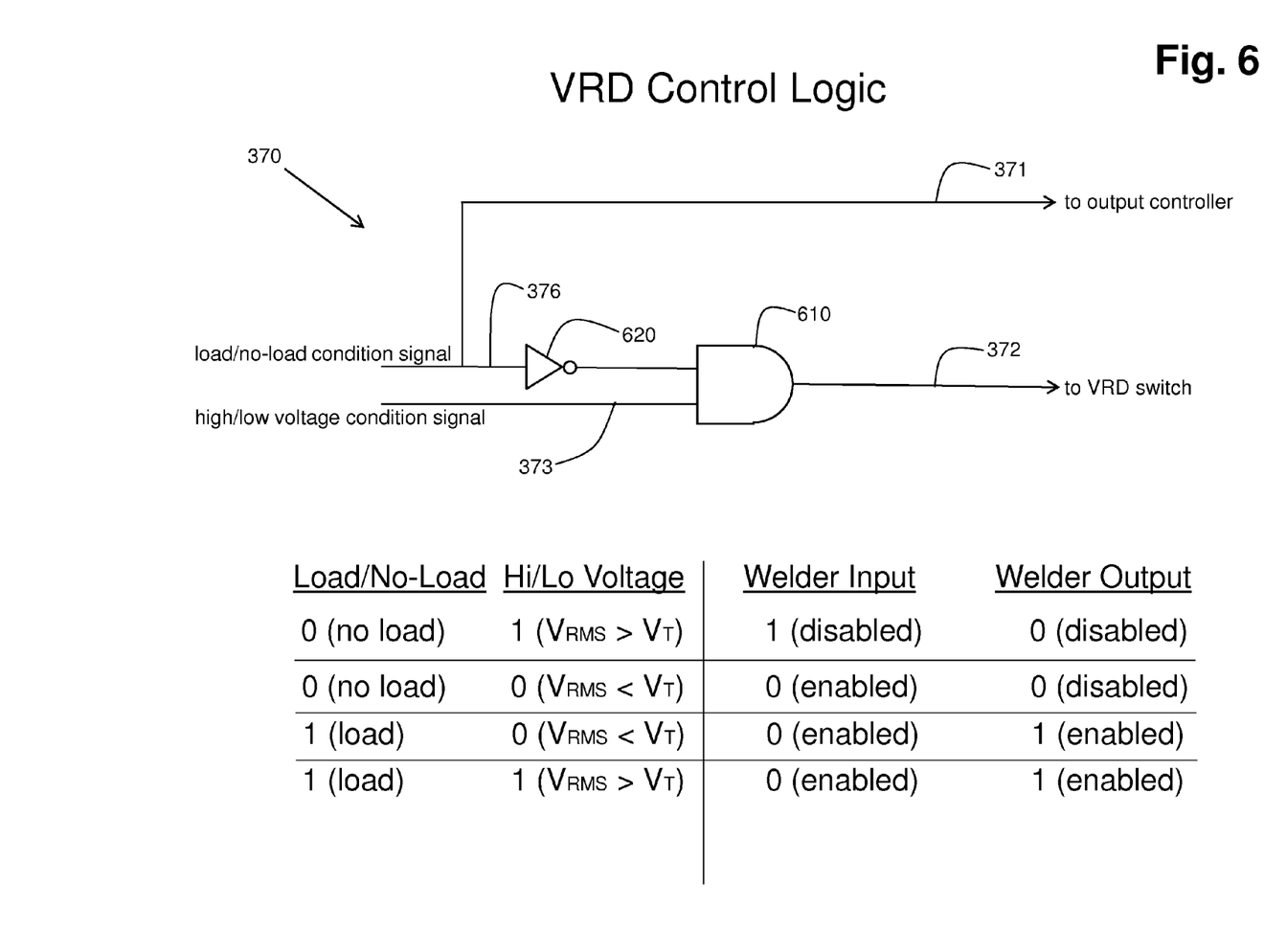
FIG. 6 illustrates a schematic diagram of an example embodiment of a voltage reduction device (VRD) control logic and associated logic truth table implemented in the voltage reduction devices of FIGS. 3-5.

FIG. 6 illustrates a schematic diagram of an example embodiment of a voltage reduction device (VRD) control logic 370 and associated logic truth table implemented in the voltage reduction devices of FIGS. 3-5. The VRD control logic 370 includes an AND gate 610 and an inverter 620. As seen in the logic truth table, when the load/no-load condition signal 376 indicates a no-load condition (e.g., a logic "0") and the high/low condition signal 373 indicates a high output voltage condition (e.g., a logic "1"), the signal 372 is a logic "1" and the VRD switch is opened (i.e., a logic "1" commands the VRD switch to open in this embodiment), disabling the welder input side of the power source. Furthermore, the signal 371 to the output controller is a logic "0" which tells the output controller to disable the welder output side of the power source. As an example, a no-load condition may exist when the resistance between the welding output terminals A and B is greater than 100 ohms. Similarly, a high output voltage condition may exist when the voltage between the welding output terminals A and B is greater than 50 volts RMS (i.e., $V_T > 50 \, V_{RMS}$).

Continuing with the logic truth table, when a no-load condition exists and a low output voltage condition exists, the welder input is enabled but the welder output is disabled. When a load condition exists and a low output voltage condition exists, both the welder input and the welder output are enabled. This may correspond to a situation where the electrode E is being touched to the workpiece W forming a short. When a load condition exists and a high output voltage condition exists, both the welder input and the welder output are enabled. This may correspond to an active welding situation, for example, where an arc exists between the electrode E and the workpiece W.

Therefore, according to the logic of FIG. 6, the load/no-load condition signal 376 determines whether or not the welder output is enabled or disabled. Both the load/no-load condition signal 376 and the high/low voltage condition signal 373 determine whether or not the welder input is enabled or disabled via the VRD switch. Of course, in accordance with various embodiments of the present invention, the trigger switch signal 377 and/or the current feedback signal 374 may be included in the control logic as well (e.g., see U.S. Pat. No. 7,238,917).

Figure 7:
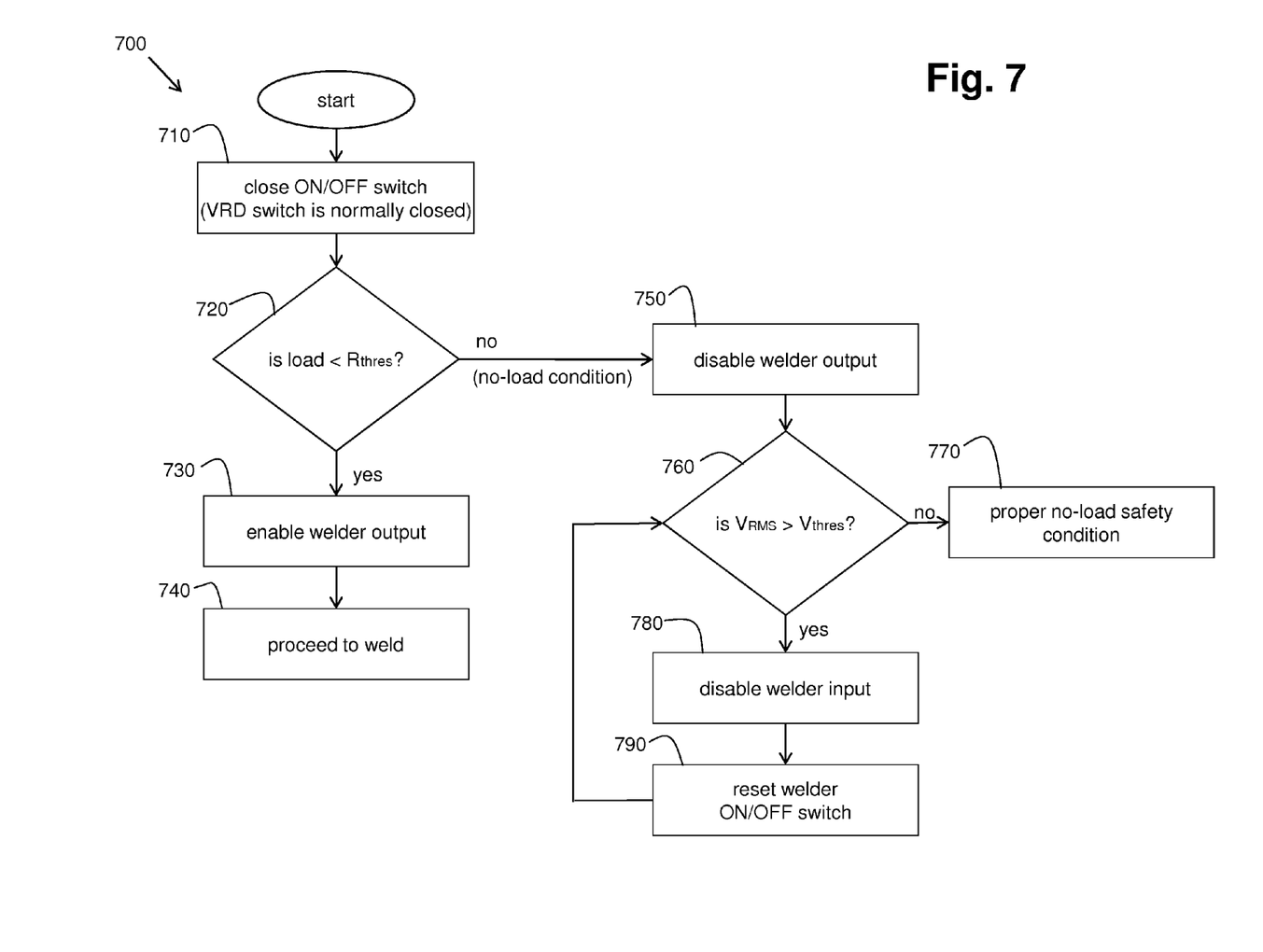
FIG. 7 is a flowchart of an example embodiment of a method for providing voltage reduction capability in the electric arc welder of FIG. 1 using the voltage reduction devices of FIGS. 3-5 and the voltage reduction control logic of FIG. 6.

FIG. 7 is a flowchart of an example embodiment of a method 700 for providing voltage reduction capability in the electric arc welder 900 of FIG. 1 using the voltage reduction devices of FIGS. 3-5 and the voltage reduction control logic 370 of FIG. 6. In step 710, the on/off switch 340 is closed (and the VRD switch 350 is normally closed), enabling the input power side of the welding power source. In step 720, if the resistive load on the output terminals A and B is less than a threshold value $R_{thres}$ (e.g., 100 ohms) indicating a load condition then, in step 730, the output power side of the welding power source is enabled and, in step 740, a user may proceed to weld.

If, however, in step 720, the resistive load on the output terminals A and B is greater than the threshold value $R_{thres}$ indicating a no-load condition then, in step 750, the output power side of the welding power source is disabled. Furthermore, in step 760, if the output voltage (e.g., the RMS output voltage $V_{RMS}$) is not greater than a threshold value $V_{thres}$ indicating a low output voltage condition then, in step 770, since the output power side is disabled and the output voltage is low, the welder is in a proper no-load safety condition.

However, in step 760, if the output voltage (e.g., the RMS output voltage $V_{RMS}$) is greater than the threshold value $V_{thres}$ indicating a high output voltage condition then, in step 780, the input power side of the welding power source is also disabled. This provides an extra measure of safety in case a failure were to occur on the output power side of the welding power source, allowing power to get to the output terminals A and B (e.g., if the SCR 395 in FIG. 3 were to short). In step 790, the on/off switch 340 is reset (i.e., turned off and then on again) in an attempt to reset the welder to re-enable the input power side by causing the VRD switch 350 to close. The method 700 reverts back to step 760 to check if the high output voltage condition still exists. If so, the VRD switch 350 is immediately opened again.

In summary, an embodiment of the present invention comprises a method of providing a voltage reduction capability in a welding power source. The method includes sensing an induced signal, from within a welding power source, to generate a sensed signal being indicative of a load condition or a no-load condition between an electrode output terminal and a workpiece output terminal of the welding power source. The method further includes detecting an output voltage, from within the welding power source, being indicative of a low output voltage condition or a high output voltage condition across the electrode output terminal and the workpiece output terminal. The method also includes disabling an input power side of the welding power source, from within the welding power source, when the sensed signal is indicative of a no-load condition and the output voltage is indicative of a high output voltage condition. In accordance with an embodiment of the present invention, the sensed signal is indicative of a no-load condition when a resistance between the output terminals is greater than about 100 ohms, and the output voltage is indicative of a high output voltage condition when the output voltage level is greater than about 50 $V_{RMS}$. The method may further include disabling an output power side of the welding power source, from within the welding power source, when the sensed signal is indicative of a no-load condition. The induced signal is an oscillating signal induced in an output current path of the welding power source, in accordance with an embodiment of the present invention, and the output voltage is a root-mean-square (RMS) voltage. The step of disabling the input power side of the welding power source may be accomplished by automatically opening a voltage reduction device (VRD) switch on the input power side which is in series with a main ON/OFF switch of the welding power source and a coil of an input power contact relay of the welding power source.

Another embodiment of the present invention comprises a device for providing a voltage reduction capability in a welding power source. The device includes means for inducing an oscillating signal, from within a welding power source, in an output current path of the welding power source. The device further includes means for sensing the induced oscillating signal, from within the welding power source, to generate a sensed signal being indicative of a load condition or a no-load condition between an electrode output terminal and a workpiece output terminal of the welding power source. The device also includes means for detecting an RMS output voltage, from within the welding power source, being indicative of a low output voltage condition or a high output voltage condition across the electrode output terminal and the workpiece output terminal. The sensed signal is indicative of a no-load condition when a resistance level between the output terminals is greater than a defined threshold value, and the output voltage level is indicative of a high output voltage condition when the RMS output voltage is greater than a defined threshold value, in accordance with an embodiment of the present invention. The device further includes means for disabling an input power side of the welding power source, from within the welding power source, when the sensed signal is indicative of a no-load condition and the RMS output voltage is indicative of a high output voltage condition. The device may also include means for enabling an output power side of the welding power source, from within the welding power source, when the sensed signal is indicative of a load condition. The device may further include means for supplying electrical power to at least the means for inducing, the means for sensing, and the means for disabling, even when an input power contact relay of the welding power source is not energized. The electrical power is derived from the input power side of the welding power source through an auxiliary transformer, in accordance with an embodiment of the present invention.

A further embodiment of the present invention comprises an apparatus for providing a voltage reduction capability in a welding power source. The apparatus includes a tuned receiver circuit configured within the welding power source to receive an oscillating signal induced in the welding output current path within the welding power source and to generate a logical load condition signal therefrom. The apparatus further includes a voltage sensing circuit configured within the welding power source to detect a voltage between an electrode output terminal and a workpiece output terminal of the welding power source and to generate a logical output voltage condition signal. The apparatus also includes a voltage reduction device (VRD) switch in series with a main ON/OFF switch of the welding power source and a coil of an input power contact relay of the welding power source on an input power side of the welding power source. The apparatus further includes a voltage reduction device (VRD) control logic circuit configured within the welding power source to open the VRD switch when the logical load condition signal indicates a no-load condition and the logical output voltage condition signal indicates a high output voltage condition. The apparatus may also include an oscillator circuit configured within the welding power source to induce the oscillating signal in the welding output current path. The VRD control logic circuit may be further configured within the welding power source to command an output controller of the welding power source to enable an output power side of the welding power source when the logical load condition signal indicates a load condition. The apparatus may further include a VRD power supply configured to provide electrical power to at least one of the tuned receiver circuit, the voltage sensing circuit, the VRD control logic circuit, the oscillator circuit, and the VRD switch. In accordance with an embodiment of the present invention, the VRD power supply is operatively connected to an auxiliary transformer of the welding power source on an input power side of the welding power source. The VRD power supply is capable of deriving electrical power from a secondary side of the auxiliary transformer whether or not the input power contact relay is energized, and when the main ON/OFF switch of the welding power source is closed. The logical load condition signal is indicative of a no-load condition when a resistance level between the output terminals is greater than a defined threshold value. The logical output voltage condition signal is indicative of a high output voltage condition when the voltage is greater than a defined threshold value.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A device for providing a voltage reduction capability in a welding power source, said device comprising:
   means for inducing an oscillating signal, from within a welding power source, in an output current path of said welding power source;
   means for sensing said induced oscillating signal, from within said welding power source, to generate a sensed signal being indicative of a load condition or a no-load condition between an electrode output terminal and a workpiece output terminal of said welding power source;
   means for detecting an RMS output voltage, from within said welding power source, being indicative of a low output voltage condition or a high output voltage condition across said electrode output terminal and said workpiece output terminal; and
   means for disabling an input power side of said welding power source, from within said welding power source, when said sensed signal is indicative of a no-load condition and said RMS output voltage is indicative of a high output voltage condition,
   wherein said means for disabling said input power side of said welding power source is realized by automatically opening a VRD switch on said input power side that is in series with a main ON/OFF switch of said welding power source and a coil of an input power contact relay of said welding power source.

2. The device of claim 1 further comprising means for enabling an output power side of said welding power source, from within said welding power source, when said sensed signal is indicative of a load condition.

3. The device of claim 1 further comprising means for supplying electrical power to at least said means for inducing, said means for sensing, and said means for disabling, even when an input power contact relay of said welding power source is not energized.

4. The device of claim 1 further comprising means for supplying electrical power to at least one of said means for inducing, said means for sensing, said means for detecting, and said means for disabling, wherein said electrical power is derived from said input power side of said welding power source through an auxiliary transformer.

5. The device of claim 1 wherein said sensed signal is indicative of a no-load condition when a resistance level between said output terminals is greater than a defined threshold value.

6. The device of claim 1 wherein said RMS output voltage is indicative of a high output voltage condition when said RMS output voltage is greater than a defined threshold value.

7. An apparatus for providing a voltage reduction capability in a welding power source, said apparatus comprising:
   a tuned receiver circuit configured within said welding power source to receive an oscillating signal induced in a welding output current path within said welding power source and to generate a logical load condition signal therefrom;
   a voltage sensing circuit configured within said welding power source to detect a voltage between an electrode output terminal and a workpiece output terminal of said welding power source and to generate a logical output voltage condition signal;
   a voltage reduction device (VRD) switch in series with a main ON/OFF switch of said welding power source and a coil of an input power contact relay of said welding power source on an input power side of said welding power source; and
   a voltage reduction device (VRD) control logic circuit configured within said welding power source to open said VRD switch when said logical load condition signal indicates a no-load condition and said logical output voltage condition signal indicates a high output voltage condition.

8. The apparatus of claim 7 further comprising an oscillator circuit configured within said welding power source to induce said oscillating signal in said welding output current path.

9. The apparatus of claim 8 further comprising a VRD power supply configured to provide electrical power to at least one of said tuned receiver circuit, said voltage sensing circuit, said VRD control logic circuit, said oscillator circuit, and said VRD switch.

10. The apparatus of claim 9 wherein said VRD power supply is operatively connected to an auxiliary transformer of said welding power source on an input power side of said welding power source, and wherein said VRD power supply is capable of deriving electrical power from a secondary side of said auxiliary transformer whether or not said input power contact relay is energized, and when said main ON/OFF switch of said welding power source is closed.

11. The apparatus of claim 7 wherein said VRD control logic circuit is further configured within said welding power source to command an output controller of said welding power source to enable an output power side of said welding power source when said logical load condition signal indicates a load condition.

12. The apparatus of claim 7 wherein said logical load condition signal is indicative of a no-load condition when a resistance level between said output terminals is greater than a defined threshold value.

13. The apparatus of claim 7 wherein said logical output voltage condition signal is indicative of a high output voltage condition when said voltage is greater than a defined threshold value.

14. A method of providing a voltage reduction capability in a welding power source, said method comprising:
   sensing an induced signal, within a welding power source, to generate a sensed signal being indicative of a load condition or a no-load condition between an electrode output terminal and a workpiece output terminal of said welding power source;
   detecting an output voltage, within said welding power source, being indicative of a low output voltage condition or a high output voltage condition across said electrode output terminal and said workpiece output terminal; and
   disabling an input power side of said welding power source, within said welding power source, by automatically opening a VRD switch on said input power side that is in series with a main ON/OFF switch of said welding power source and a coil of an input power contact relay of said welding power source, when said sensed signal is indicative of a no-load condition and said output voltage is indicative of a high output voltage condition.

15. The method of claim 14 further comprising disabling an output power side of said welding power source, within said welding power source, when said sensed signal is indicative of a no-load condition.

16. The method of claim 14 wherein said induced signal is an oscillating signal induced in an output current path of said welding power source.

17. The method of claim 14 wherein said output voltage is an RMS voltage.

18. The method of claim 14 wherein said sensed signal is indicative of a no-load condition when a resistance between said output terminals is greater than about 100 ohms.

19. The method of claim 14 wherein said output voltage level is indicative of a high output voltage condition when said output voltage is greater than about 50 VRMS.

* * * * *